United States Patent [19]
Eldred

[11] 3,807,534
[45] Apr. 30, 1974

[54] FRICTION DISC

[75] Inventor: Wendell E. Eldred, South Bend, Ind.

[73] Assignee: The Bendix Corporation, South Bend, Ind.

[22] Filed: June 16, 1972

[21] Appl. No.: 263,519

[52] U.S. Cl. ...... 188/73.2, 188/218 XL, 192/107 R
[51] Int. Cl. ............................................ F16d 65/12
[58] Field of Search ................... 188/218 XL, 73.2; 192/107 R

[56] References Cited
UNITED STATES PATENTS
3,403,759   10/1968   Holcomb, Jr. ................. 188/218 XL
3,548,979   12/1970   Nelson et al. ............. 188/218 XL X
3,552,533   1/1971    Nitz ............................ 188/251 A X FOREIGN PATENTS OR APPLICATIONS
333,073   8/1930   Great Britain .................. 192/107 R Primary Examiner—George E. A. Halvosa
Attorney, Agent, or Firm—Gordon H. Chenez; William N. Antonis

[57] ABSTRACT

A friction disc particularly adapted for use in an aircraft multiple disc brake having frictionally engageable rotor and stator discs one or more of which is provided with segments of high thermal capacity heat sink material characterized by relatively weak structural strength in tension and shear modes. A pair of annular metal plates are fixedly secured to a plurality of radially extending torque transmitting metal arms interposed between the plates in circumferentially spaced apart relationship thereby defining pockets adapted to slidably receive mating segments of heat sink material which protrude through circumferentially spaced apart openings in each of the metal plates. The protruding surfaces of the segments of heat sink material are adapted to slidably engage adjacent friction discs and may be provided with facings of friction material.

10 Claims, 5 Drawing Figures

PATENTED APR 30 1974  3,807,534

FRICTION DISC

BACKGROUND OF THE INVENTION

The use of high thermal capacity heat sink material in aircraft disc brakes has become necessary as a result of the enormous amount of heat generated during braking of heavy and/or high speed aircraft which heat normally cannot be dissipated quickly enough to prevent metal and/or non-metal parts of the brake from attaining temperatures in excess of their ability to withstand thereby causing premature deterioration of the same. Various solutions to the above-mentioned problem have been proposed as for example, those disclosed in U.S. Pat. No. 3,251,437 issued May 17, 1966 to E. L. Moyer et al., U.S. Pat. No. 3,044,736 issued July 17, 1962 to W. D. Chambers, U.S. Pat. No. 3,376,960 issued Apr. 9, 1968 to J. R. Bender, all of which patents as well as the present application share the same assignee.

It has been found that one of the most practical solutions to the abovementioned problem from the standpoint of cost, reliability, maintenance, weight and/or structural complexity is the use of carbon or other suitable relatively high thermal capacity material suitably located to take advantage of its best strength properties and in a direct path of the heat flow from the brake disc friction surfaces to minimize the heat load imposed on the remaining brake structure.

SUMMARY OF THE INVENTION

It is an object of the present invention to provide an annular friction member having a plurality of segments of relatively high thermal capacity material slidably retained in circumferentially spaced apart order in a metal frame wherein a plurality of circumferentially spaced apart torque transmitting members separate the plurality of segments and provide a bearing surface therefore.

It is another object of the present invention to provide a simple and rugged annular friction member having a plurality of circumferentially spaced apart force transmitting segments of relatively high thermal capacity material provided with opposed friction surfaces and maintained in a compression state throughout.

Other objects and advantages of the present invention may be apparent from the following description taken with the accompanying drawings.

DESCRIPTION OF THE PREFERRED EMBODIMENT

Figure 1:
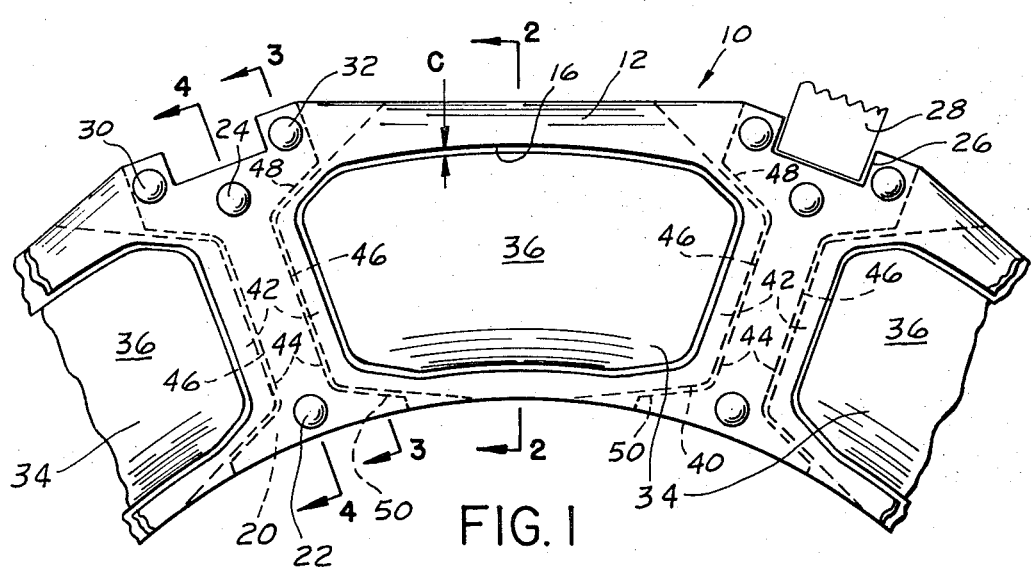
FIG. 1 is a schematic representation or plan view of a portion of an aircraft disc brake friction or rotor disc embodying the present invention.
Figure 2:
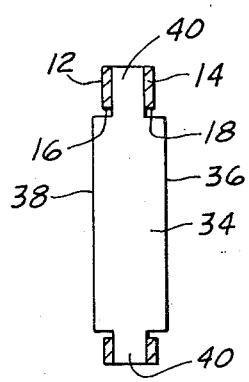
FIG. 2 is a section view take on line 2—2 of FIG. 1.
Figure 3:
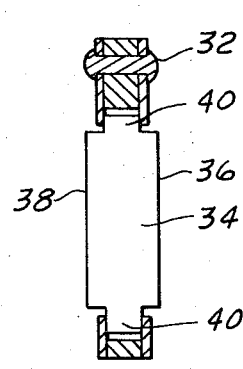
FIG. 3 is a section view taken on line 3—3 of FIG. 1.
Figure 4:
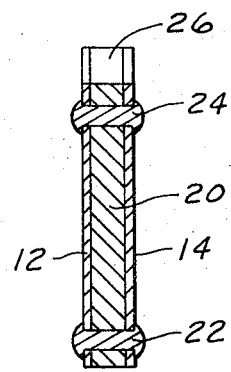
FIG. 4 is a section view taken on line 4—4 of FIG. 1.

Referring to FIGS. 1 through 4, numeral 10 designates an annular rotor disc which represents one of a plurality of rotor discs which are separated by a plurality of stator discs interleaved therewith in the conventional manner of an aircraft multiple disc brake, not shown. Reference is made to any of the heretofore mentioned U.S. Pat. Nos. 3,251,437; 3,044,736 or 3,376,960 for a specific showing of an aircraft disc brake assembly including interleaved rotor and stator discs and actuating mechanism for urging the same into frictional engagement.

The rotor disc 10 includes two spaced apart annular metal frame or plate members 12 and 14 which are provided with circumferentially spaced apart openings 16 and 18, respectively, therein. A generally I-shaped radially extending arm or strut 20 interposed between frame members 12 and 14 are fixedly secured in position midway between radially extending edges of adjacent openings 16 in the frame 12 and adjacent openings 18 in the frame 14. A pair of spaced apart rivets 22 and 24 extending through each of the arms 20 and frames 12 and 14 bearing thereagainst serve to fixedly secure the same together.

A keyway or slot 26 formed in the radially outermost portion of each arm 20 and adjacent frames 12 and 14 is adapted to receive a transverse key member 28 fixedly secured to a wheel, not shown. The key member 28 serves to link the rotor disc 10 and wheel, no shown, together thereby preventing relative rotational movement therebetween but permitting rotor disc 10 to slide axially along key member 28. A pair of rivets 30 and 32 extend through frames 12 and 14 and arm 20 on circumferentially opposite sides of keyway 26 to maintain the same in fixed relative positions.

A carbon or other suitable high thermal capacity heat sink material in the form of an irregular shape segment 34 is slidably trapped in aligned openings 16 and 18 and protrudes therethrough beyond the surfaces of frames 12 and 14 to provide oppositely disposed friction surfaces 36 and 38 adapted to engage friction surfaces of adjacent stator discs, not shown. To that end, the periphery of each segment 34 is recessed to define a tongue portion 40 having opposed radially extending sections 42 slidably received by a groove or recess 44 defined by spaced apart inner surfaces of frames 12 and 14 and radially extending intermediate edge 46 which includes spaced apart angularly extending edges 48 and 50 of opposite cross bars of arm 20. The radially innermost and outermost sections 52 and 54 of tongue portion 40 preferrably extend to the peripheral limits of the frames 12 and 14. It will be noted that the tongue portion 40, particularly sections 42 thereof, is deeper than the groove or recess 44 reviewing the same thereby establishing a clearance C between the edges of the aligned openings 16 and 18 and associated adjacent peripheral shoulders of the expanded friction surfaces 36 and 38 protruding through openings 16 and 18. The clearance C permits universal sliding movement of the segment 34 in the plane of the frames 12 and 14 under the influence of frictional forces imposed on segment 34 during a brake application. As a result, the section 42 at one end of segment 34 depending upon the direction of rotation of rotor disc 10 tends to seat against edges 46, 48 and 50 of associated arm 20 thereby maximizing the bearing area between arm 20 and segment 34 and reducing concentrated force loading on the segment 34. It will be noted the resulting bearing load tends to place segment 34 in a compression mode thereby avoiding undesirable tension and shear stresses therein.

The segments 34 are in a direct heat path relative to the friction surfaces 36 and 38 thereby reducing the heat load imposed on the frames 12 and 14 as well as arms 20 which act as a secondary heat sink.

Figure 5:
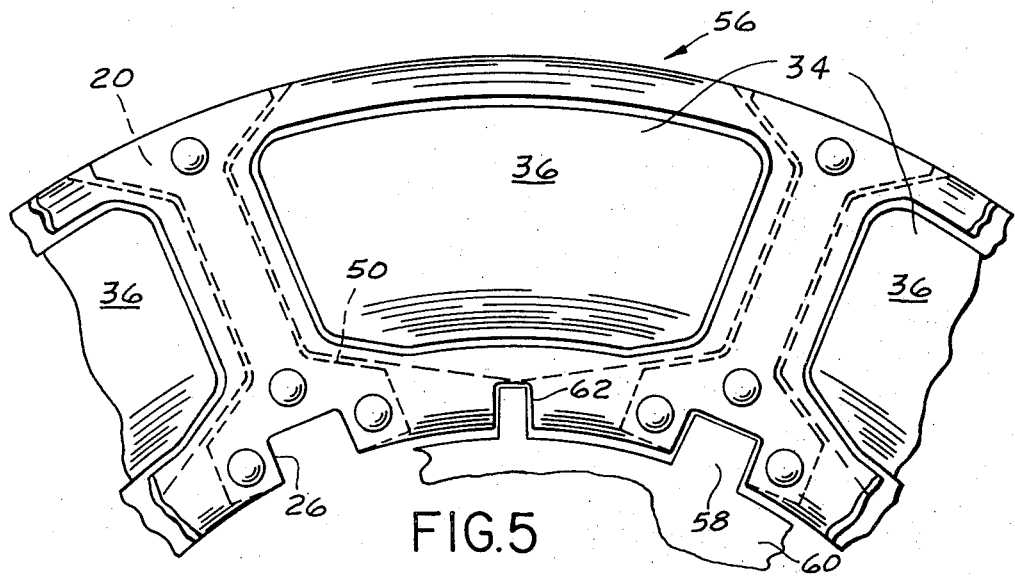
FIG. 5 represents a schematic plan view of a portion of an aircraft disc brake friction or stator disc embodying the present invention.

Referring to FIG. 5 which illustrates the disc 10 of FIG. 1 modified to form a stator disc 56, it will be noted that the arms 20 are inverted relative to the position shown in FIG. 1 thereby placing the keyway or slot 26 radially inwardly of the disc 56 and in a position to mate with mating keys 58 on a rotatably fixed axle generally indicated by 60. Additional keyways or slots 62 may be formed in the frame 12 and 14 intermediate the arms 20 if desired. In the case of additional keyways or slots 62 the angularity of edge 50 of arm 20 and thus edge of segment 34 engageable therewith may be modified as shown thereby terminating the segment 34 radially inwardly from the keyway or slot 62. However, if keyway or slots 62 are not provided, it will be understood that the angularity of edge 50 may be equivalent to that of rotor disc 10 thereby providing maximum volume of segment 34 as in the case of rotor disc 10.

The above described segments 34 have been characterized as formed of carbon which, under the chemical meaning thereof, includes any of the physical forms including combinations thereof.

Obviously, the segments 34 may be formed of material other than carbon as, for example, ceramics or the like.

I claim:

1. A friction disc comprising;
   a pair of axially spaced-apart annular frame members each of which is provided with a plurality of circumferentially spaced apart openings;
   a plurality of circumferentially spaced apart radially extending arms interposed between said frame members and axially separating said spaced apart openings in each of said frame members;
   fastening means fixedly securing said frame members to said plurality of arms;
   said openings in one frame member being aligned with said openings in the other frame member;
   a groove completely surrounding said aligned openings and, in part, defined by parallel inner surfaces of said frame members adjacent said aligned openings and an edge of said radially extending arms separating said frame members;
   a plurality of solid friction segments each having oppositely disposed friction surfaces protruding through said aligned openings and provided with a continuous peripheral tongue portion slidably received by said groove;
   said tongue portion being slidably retained between said frame members and urged into engagement with said arm in response to frictional forces imposed thereon.

2. A friction disc as claimed in claim 1 adapted for use in a wheel and disc brake assembly mounted in a fixed supporting axle and wherein:
   said friction disc is a rotor member;
   said arms are each provided with a transverse slot at the radial outward end thereof adapted to receive an associated key member fixedly secured to said wheel thereby providing for axial movement of said rotor member relative to said wheel and preventing relative rotational movement therebetween.

3. A friction disc as claimed in claim 1 adapted for use in a wheel and disc brake assembly and wherein:
   said friction disc is a stator member;
   said arms are each provided with a transverse slot at the radial inward end thereof adapted to receive an associated key member on a fixed wheel supporting axle.

4. A friction disc as claimed in claim 1, wherein:
   said tongue portion is deeper than said groove to permit universal sliding movement of said segment in the plane of said frame members.

5. A friction disc as claimed in claim 1, wherein:
   said frame members are formed of sheet metal and said arms separating the same are metal in the general form of an I.

6. A friction disc as claimed in claim 5, wherein:
   said I-shaped arms are provided with an intermediate portion having spaced apart radially extending edges and associated spaced apart diverging edges extending therefrom.

7. A friction disc as claimed in claim 6, wherein:
   said tongue portion bears against one of said radially extending edges and associated spaced apart diverging edges thereby placing said segment in a compression mode.

8. A friction disc as claimed in claim 1, wherein:
   said friction segments are formed of a material having high thermal capacity and being characteristically weak in shear and tension.

9. A friction disc as claimed in claim 8, wherein:
   said material is carbon.

10. A friction disc as claimed in claim 9, wherein:
    said carbon segments are provided with friction facings of a different material fixedly secured to said oppositely disposed surfaces thereof.

* * * * *